(12) United States Patent
Bright

(10) Patent No.: US 6,171,852 B1
(45) Date of Patent: Jan. 9, 2001

(54) APPARATUS AND METHOD FOR DECOMPOSING WASTE MATERIAL

(76) Inventor: Gary L. Bright, 47427 Brent Ct., New Baltimore, MI (US) 48047

(*) Notice: Under 35 U.S.C. 154(b), the term of this patent shall be extended for 0 days.

(21) Appl. No.: 09/368,847

(22) Filed: Aug. 5, 1999

(51) Int. Cl.[7] .............................. C05F 9/02; C12M 1/04
(52) U.S. Cl. .............................. 435/290.4; 435/262; 71/9
(58) Field of Search .................. 435/262, 290.1, 435/290.2, 290.4, 300.1; 71/9

(56) References Cited

U.S. PATENT DOCUMENTS

| | | |
|---|---|---|
| 4,410,349 | 10/1983 | Laurenson, Jr. . |
| 4,414,335 | * 11/1983 | Kipp, Jr. . |
| 4,483,704 | 11/1984 | Easter, II . |
| 4,666,854 | 5/1987 | Sugiura . |
| 4,798,802 | 1/1989 | Ryan . |
| 4,837,153 | 6/1989 | Laurenson, Jr. . |
| 5,092,407 | 3/1992 | Laurenson, Jr. . |
| 5,153,137 | 10/1992 | Laurenson, Jr. . |
| 5,175,106 | 12/1992 | Laurenson, Jr. . |
| 5,258,306 | 11/1993 | Goldfarb . |
| 5,417,736 | 5/1995 | Meyer . |
| 5,545,560 | 8/1996 | Chang . |
| 5,587,320 | 12/1996 | Shindo et al. . |
| 5,846,815 | 12/1998 | Wright . |

FOREIGN PATENT DOCUMENTS

| | | |
|---|---|---|
| 41 11 204 | * 10/1992 | (DE) . |
| 2 481 873 | * 11/1981 | (FR) . |

* cited by examiner

Primary Examiner—William H. Beisner
(74) Attorney, Agent, or Firm—Brooks & Kushman P.C.

(57) ABSTRACT

A composting system for decomposing waste material includes a composting bay adapted to receive the waste material. A transport member extends into the composting bay and is adapted to receive the waste material thereon. The transport member is moveable with respect to the bay for transporting waste material along the bay. The composting system further includes a fluid distribution system having at least one fluid injection member adapted to extend into the waste material. The at least one fluid injection member is moveably attachable to the bay such that the at least one fluid injection member is moveable with the waste material along a portion of the bay. The at least one fluid injection member has at least one opening for introducing fluid into the waste material. A method for decomposing waste material is also disclosed.

21 Claims, 4 Drawing Sheets

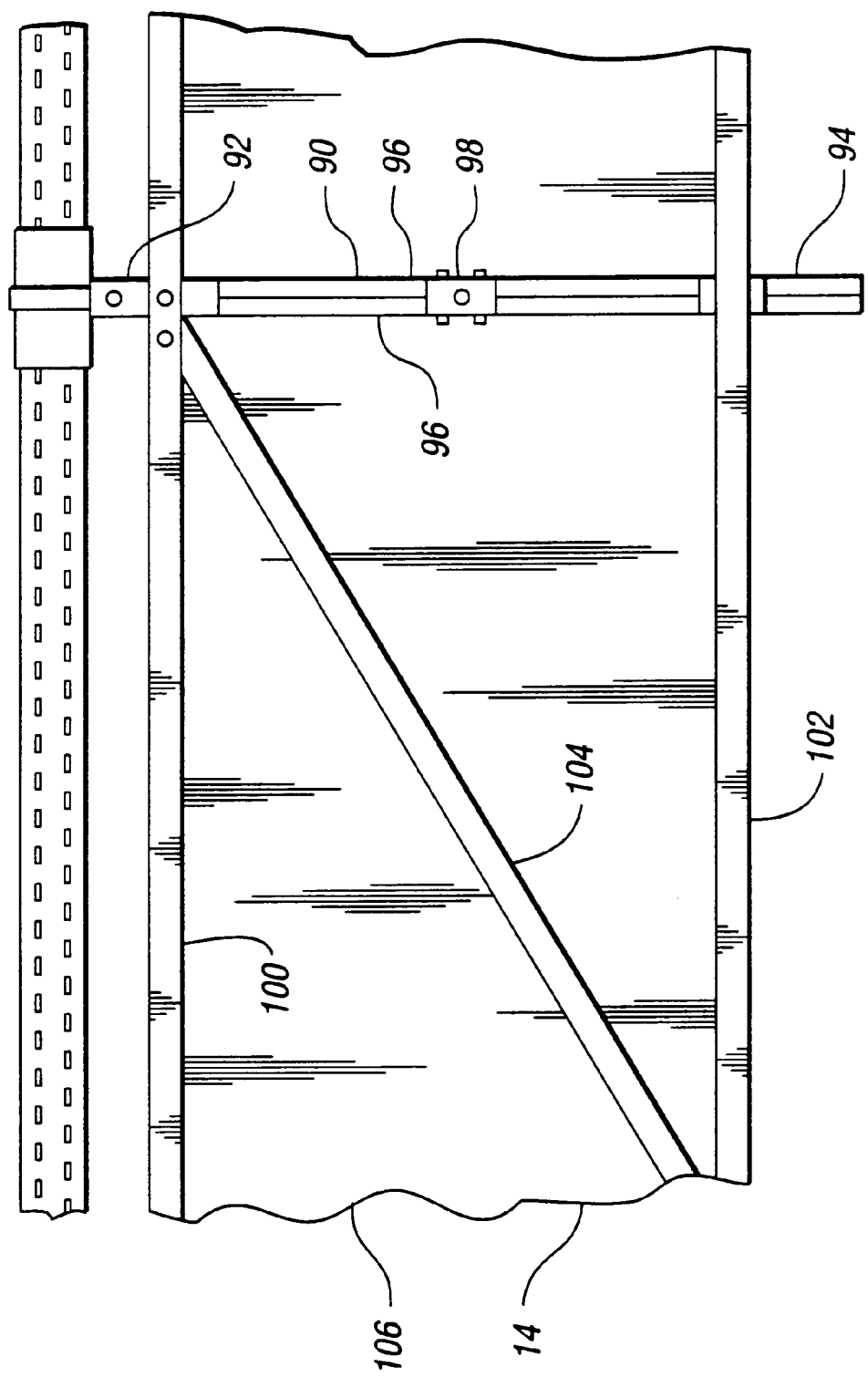

APPARATUS AND METHOD FOR DECOMPOSING WASTE MATERIAL

TECHNICAL FIELD

The invention relates to an apparatus and method for aerobically decomposing waste material utilizing a fluid distribution system that includes at least one fluid injection member that is moveable with the waste material.

BACKGROUND ART

Waste material, and especially organic waste material, may be decomposed by various micro-organisms. The decomposition process may also be enhanced by the addition of air to the waste material. The end product is a compost material which may be used as a soil nutrient and/or additive in such activities as farming and gardening.

A number of apparatuses and methods have been developed to decompose waste material. U.S. Pat. No. 4,837,153, for example, discloses a composting apparatus that includes a plurality of lances that may be inserted into waste material for introducing air into the waste material. Each of the lances includes a rotatable inner tube, a middle tube, an outer mesh tube, and a plurality of gaskets disposed between the middle and outer tubes to control air flow. With such a configuration, the lances are relatively complex and costly to manufacture. Furthermore, the lances are connected to one or more blowers that provide a relatively high volume of air to the lances such that process costs are significant.

U.S. Pat. No. 5,846,815 discloses a continuous composter with self contained aeration zones so that air is confined to any one zone. An inlet fan and an exhaust fan are provided for each zone, and the inlet fans provide air to the zones through conveyor trays moveably disposed proximate the bottom of the composter. The conveyor trays are also adapted to support waste material thereon for moving the waste material along the composter. Such an arrangement is relatively complex and costly to manufacture. Furthermore, because air is introduced to the waste material near the bottom of the composter, rather than being injected into the waste material, portions of the waste material may experience little or no air flow. Consequently, such portions of the waste material may experience little or no aerobic activity.

U.S. Pat. No. 5,417,736 discloses a method for aerobic composition of organic waste material that involves high flow-rate aeration. The apparatus used in the method includes a bag for receiving the waste material, a plurality of air conduits that penetrate the bag and are adapted to extend into the waste material, and a blower connected to the air conduits for supplying air to the air conduits. The method and apparatus disclosed are undesirable for at least a couple of reasons. First, the method involves introducing a relatively high volume of air into the waste material such that process costs are significant. Second, untreated process air is discharged directly to the atmosphere through vents in the bag.

DISCLOSURE OF INVENTION

The invention overcomes the shortcomings of the prior art by providing a new and improved composting system and method of decomposing waste material that utilizes a novel fluid distribution system for introducing fluid into the waste material. The fluid distribution system effectively distributes fluid throughout the waste material, while significantly reducing air treatment costs compared with prior art composting systems and methods.

Under the invention, a composting system for decomposing waste material includes a composting bay adapted to receive the waste material. A transport member extends into the composting bay and is adapted to receive the waste material thereon. The transport member is moveable with respect to the bay for transporting waste material along the bay. The composting system further includes a fluid distribution system having at least one fluid injection member adapted to extend into the waste material. The at least one fluid injection member is moveably attachable to the bay such that the at least one fluid injection member is moveable with the waste material along a portion of the bay. The at least one fluid injection member has at least one opening for introducing fluid into the waste material.

The fluid distribution system preferably comprises an air compressor in communication with the at least one fluid injection member for supplying air to the at least one fluid injection member. Advantageously, the air compressor provides relatively high pressure air so that the air effectively and efficiently permeates the waste material. Furthermore, the air compressor provides a relatively small volume of air compared with prior art systems and methods, which results in significantly lower air treatment costs.

In addition, the fluid distribution system further comprises a steam generating unit for supplying steam to the waste material. Advantageously, the steam may be used to quickly elevate the temperature of the waste material to thereby stimulate the decomposition process.

More specifically, a composting system according to the invention for decomposing waste material includes an enclosed composting bay having a bottom, a roof enclosure and first and second ends. A transport member is disposed proximate the bottom of the bay and is adapted to receive the waste material thereon. The transport member is moveable with respect to the bay for transporting waste material between the ends of the bay. A guide system is attached to the bay proximate the roof enclosure. The composting system further includes a plurality of fluid distribution cells movably attachable to the guide system such that the cells are movable with the waste material along a portion of the bay. Each of the cells has a plurality of fluid injection members adapted to extend into the waste material for injecting fluid into the waste material.

Under the invention, a method of decomposing waste material includes positioning the waste material in a composting system having a moveable transport member and a moveable fluid injection member such that the waste material surrounds a portion of the fluid injection member; moving the transport member to thereby move the waste material within the composting system; moving the fluid injection member such that the fluid injection member moves with the waste material; and introducing fluid into the waste material from the fluid injection member.

Preferably, moving the fluid injection member occurs as a result of moving the transport member.

The step of introducing fluid preferably comprises introducing air into the waste material. Additionally, the step of introducing fluid preferably comprises introducing steam into the waste material. Advantageously, the introduction of fluids into the waste material can be precisely controlled to maintain optimum conditions for continuous aerobic decomposition of the waste material.

More specifically, a method according to the invention of decomposing waste material includes providing a composting system having an enclosed composting bay and a plurality of fluid injection members moveably attached to the bay and adapted to extend into the waste material, the bay having first and second ends; introducing the waste material into the bay proximate the first end such that the waste material surrounds a portion of each of the fluid injection members; moving the waste material between the first and second ends; moving the fluid injection members such that the fluid injection members move with the waste material; and introducing fluid into the waste material from the fluid injection members.

These and other objects, features and advantages of the invention are readily apparent from the following detailed description of the best modes for carrying out the invention when taken in conjunction with the accompanying drawings.

BRIEF DESCRIPTION OF DRAWINGS

FIG. 7 is a fragmentary view of a side wall of the composting system.

BEST MODE FOR CARRYING OUT THE INVENTION

Figure 1:
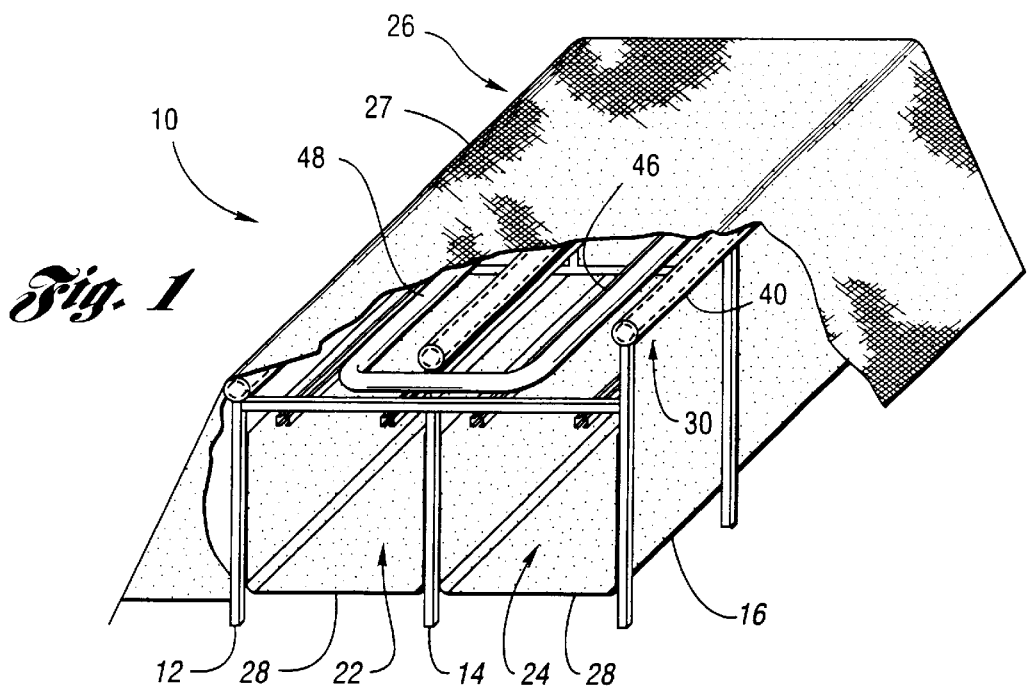
FIG. 1 is a partially cut away perspective view of a composting system according to the invention and including first and second bays enclosed by a roof enclosure.
Figure 2:
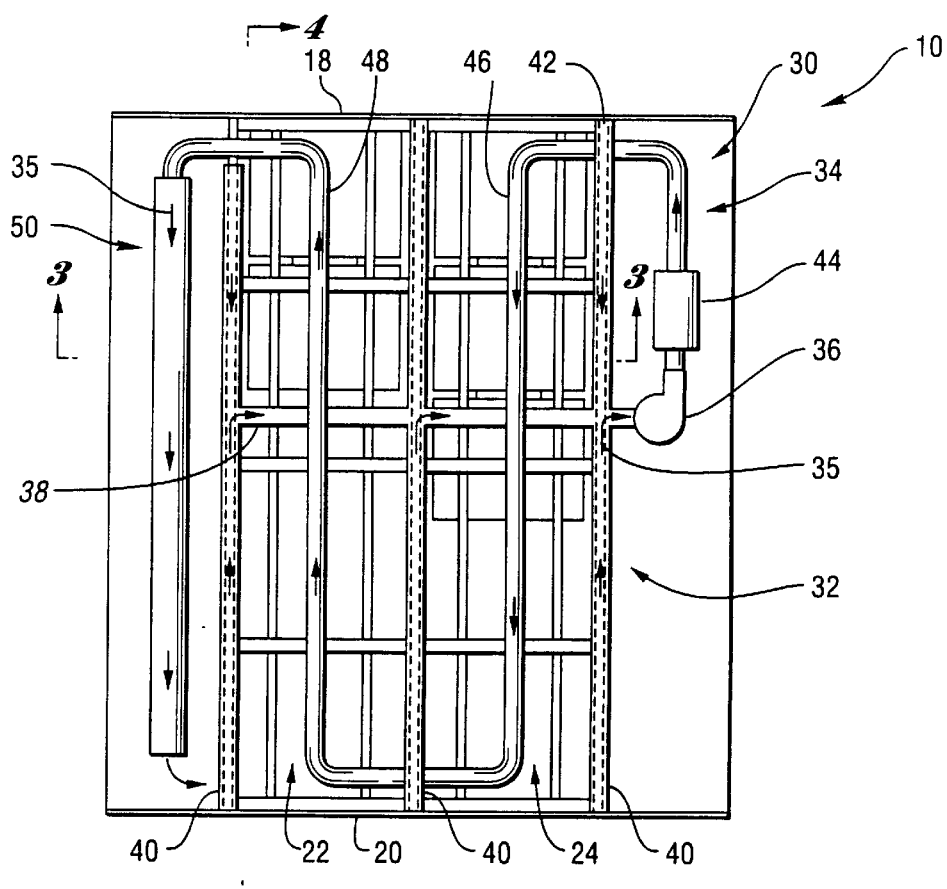
FIG. 2 is a plan view of the composting system with the roof enclosure removed to show a vapor treatment system.

FIGS. 1 and 2 show a composting system 10 according to the invention for decomposing waste material such as paper, leaves, grass, sludge, and/or any other compostable waste material. The composting system 10 includes three vertical side walls 12, 14 and 16, and two vertical end walls 18 and 20. The vertical walls 12–20 define first and second composting bins or bays 22 and 24, respectively. Waste material is placed in these bays 22 and 24 during the decomposition process. While the embodiment described includes the two bays 22 and 24, the composting system 10 may be provided with one or more bays.

The composting system 10 is preferably configured such that the bays 22 and 24 are effectively sealed from the surrounding environment. A roof enclosure 26 is placed over the vertical walls 12–20 to enclose the bays 22 and 24. The roof enclosure 26 comprises roof sheeting 27 such as twenty-four ounce per yard vinyl with a tedlar coating commonly used in the air structure industry. The roof sheeting 27 may be held in place in any suitable manner such as with steel cable (not shown) and/or with snap fasteners (not shown).

Each of bays 22 and 24 is also preferably lined with a liner 28 to inhibit seepage from the bays 22 and 24 into the surrounding environment. While the liners 28 may comprise any suitable material, in a preferred embodiment the liners comprise high density polyethylene sheeting having a thickness of 45 millimeters or more. Furthermore, the liners 28 may be attached to the vertical walls 12–20 in any suitable manner.

Figure 3:
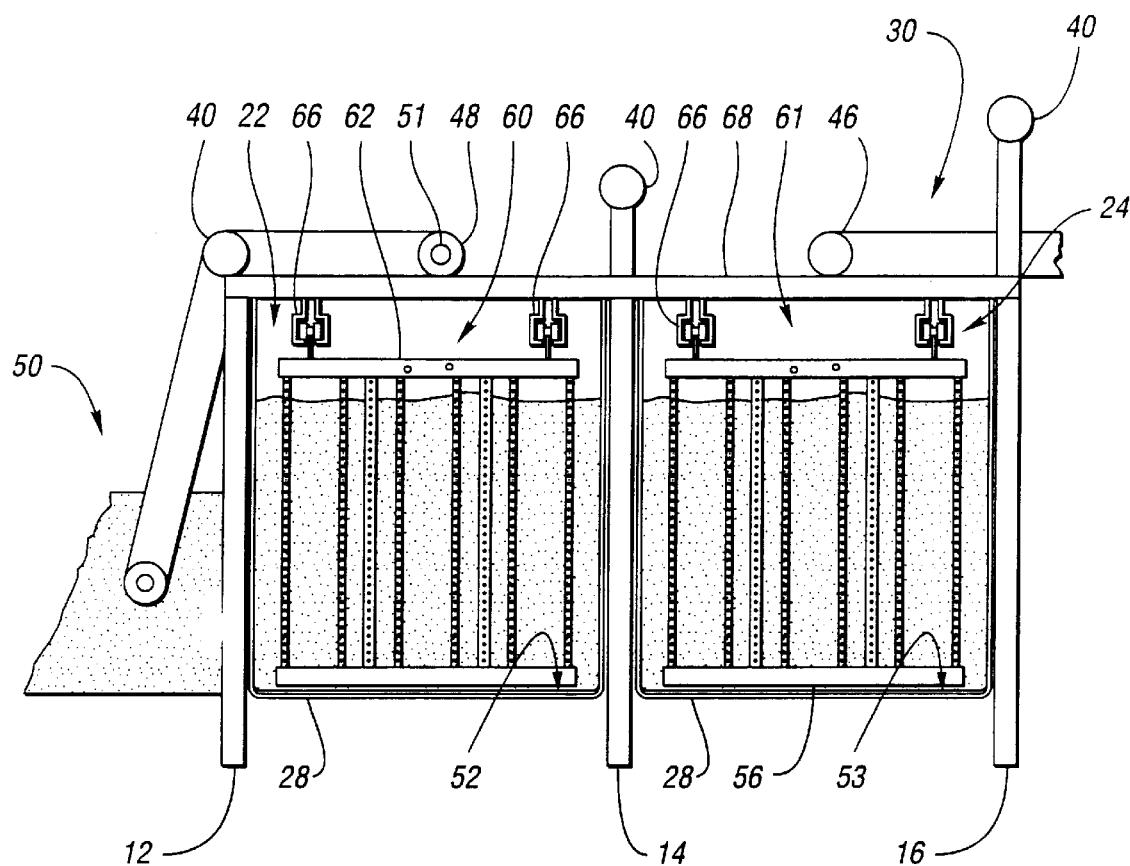
FIG. 3 is a sectional view taken along line 3—3 of FIG. 2.

As shown in FIGS. 1–3, the composting system 10 includes an air or vapor treatment system 30 that comprises a vapor collection system, shown generally at 32, and a filtration system, shown generally at 34. The vapor collection system 32 collects air and gases produced during the decomposition process, and the filtration system 34 filters and/or treats the air and gases before they are returned to the bays and/or released to the atmosphere. The flow of air and gases through the vapor treatment system 30 is indicated by arrows 35.

The vapor collection system 32 includes a suction blower 36, a header 38 connected to the blower 36, and a plurality of collection tubes 40 connected to the header 38. Each of the collection tubes 40 has a plurality of slots 42 in communication with at least one of the bays 22 and 24.

The filtration system 34 includes a pre-filter 44 disposed downstream of the blower 36, and the pre-filter 44 preferably includes a plurality of filter elements, such as fine-mesh filters and/or charcoal bag filters. The filtration system 30 further includes first and second treatment tubes 46 and 48, respectively, and a bio-filter 50. A plurality of charcoal filter elements are spaced at equal intervals along the first treatment tube 46 for removing impurities from the air and gases collected by the vapor collection system 32. The second treatment tube 48 includes a perforated inner steam tube 51 for introducing steam into the collected air and gases to thereby sterilize the air and gases. The bio-filter 50 includes a perforated PVC pipe surrounded by filtration media such as wood chips, leaves, and/or composted waste material. The bio-filter 50 further includes a perforated steam tube disposed within the PVC pipe for introducing steam into the air and gases to thereby sterilize the air and gases.

Figure 4:
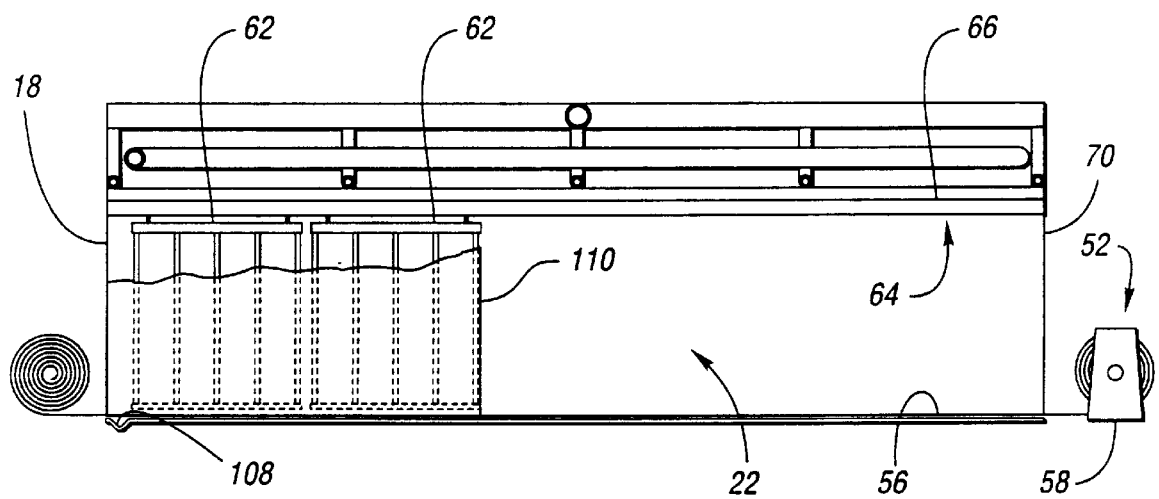
FIG. 4 is a sectional view taken along line 4—4 of FIG. 2 and showing a plurality of fluid injection cells.

As shown in FIGS. 3 and 4, the composting system 10 further includes first and second material transport systems 52 and 53, respectively, which respectively extend into the first and second bays 22 and 24 for moving the waste material along the bays 22 and 24. Each of the material transport systems 52 and 53 preferably includes a transport member, such as a nylon net 56, and an electric winch 58 connected to the net 56 for moving the net along a respective bay 22 and 24. Alternatively, each of the material transport systems 52 and 53 may comprise any known system sufficient to move the waste material along a respective bay 22 and 24.

As further shown in FIGS. 3 and 4, the composting system 10 includes first and second fluid distribution systems 60 and 61, respectively, for injecting fluid such as air, water and/or steam into the waste material. Each of the fluid distribution systems 60 and 61 includes a plurality of fluid injection racks or cells 62 that are adapted to receive the waste material, and are moveably attachable to a guide system 64 having one or more guide rails 66. The guide rails 66 are preferably made of coated steel, such as painted or galvanized steel, and are connected to horizontal cross members 68, which are supported by the vertical side walls 12, 14 and 16. Advantageously, each of the fluid injection cells 62 can move with the waste material from end to end of a particular bay 22 and 24.

Figure 5:
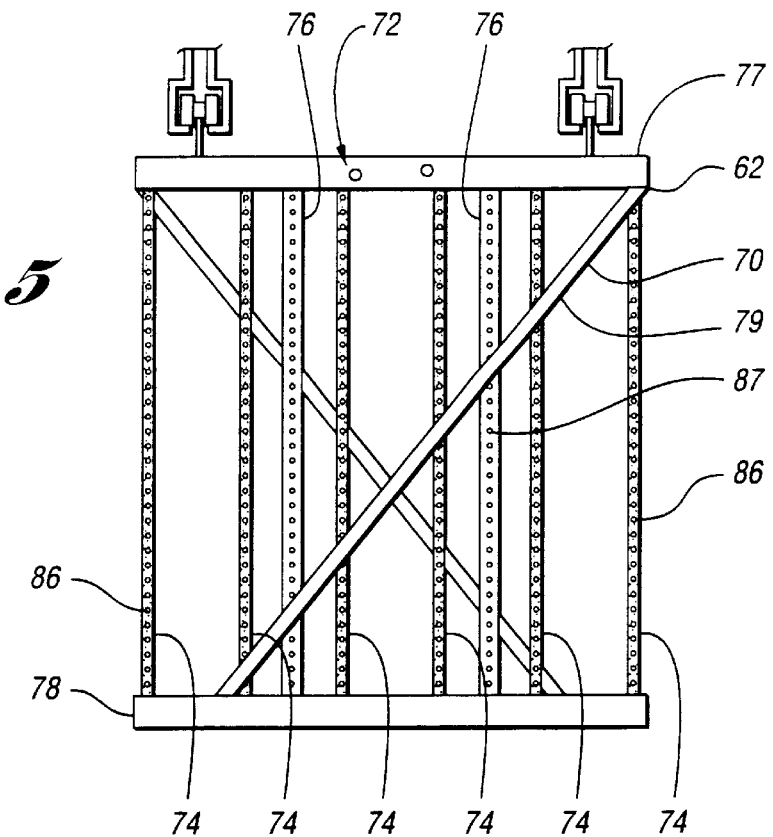
FIG. 5 is a front view of one of the fluid injection cells.
Figure 6:
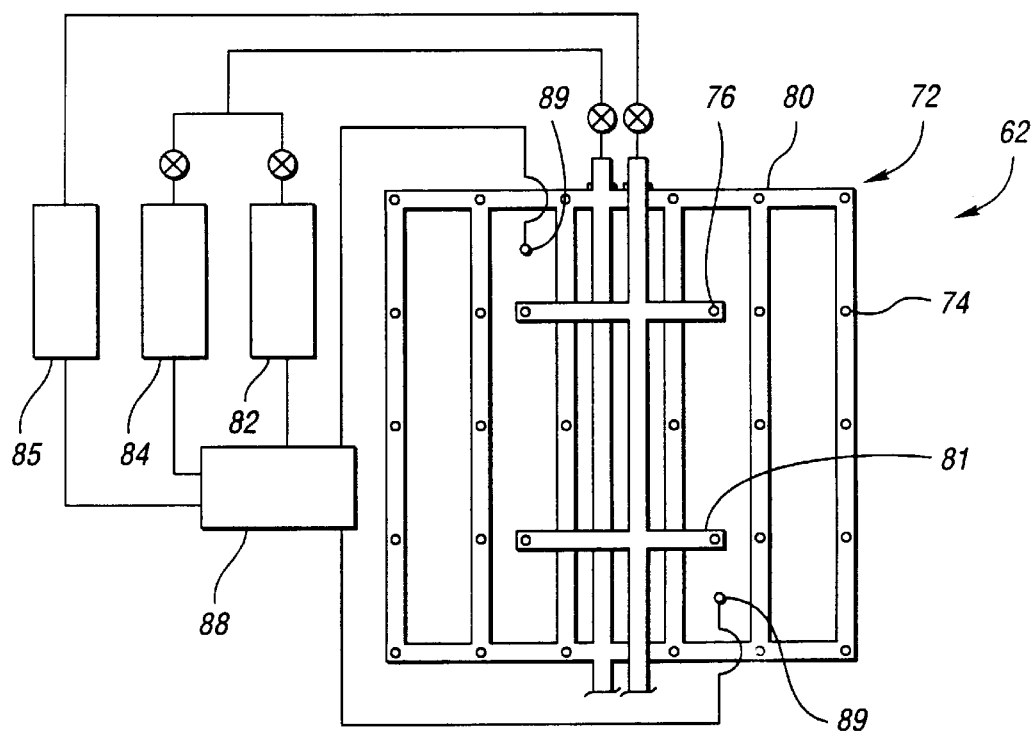
FIG. 6 is a schematic plan view of the injection cell shown in FIG. 5.

As shown in FIGS. 5 and 6, each of the fluid injection cells 62 has an aluminum frame 70, a manifold system 72 supported by the frame 70, and a plurality of vertical fluid injection members, such as rubber hoses or tubes 74 and stainless steel tubes 76, which are also supported by the frame 70. The frame 70 has top and bottom portions 77 and 78, respectively, connected by a plurality of cross members 79.

The manifold system 72 includes first and second manifolds 80 and 81, respectively, and the first and second manifolds 80 and 81 of one fluid injection cell 62 are adapted to be respectively connected to the first and second manifolds 80 and 81 of another fluid injection cell 62 in any suitable manner, such as with quick connect couplings. The first manifold 80 is in fluid communication with an air compressor 82 for supplying compressed air to the fluid injection cell 62, and a pressurized hot water heater 84 for supplying pressurized, heated water to the fluid injection cell 62. Additionally, the second manifold 81 is in fluid communication with a steam generation unit 85 for supplying steam to the fluid injection cell 62.

The rubber tubes 74 are in fluid communication with the first manifold 80, and are preferably used to inject air and/or water into the waste material. Each rubber tube 74 preferably has an outer diameter of about ¼ inch, and further has a plurality of staggered openings 86 through which fluid may pass. Furthermore, each rubber tube 74 is preferably supported at each of its ends by the frame 70 so that the rubber tubes 74 remain fully extended.

The stainless steel tubes 76 are in fluid communication with the second manifold 81, and are preferably used to inject steam into the waste material. Each stainless steel tube 76 preferably has an outer diameter of about ½ inch, and further has a plurality of staggered openings 87 through which fluid may pass. Each stainless steel tube 76 is also preferably supported at each of its ends by the frame 70.

The openings 86 and 87 in the tubes 74 and 76 are preferably sufficiently small to inhibit the waste material from clogging the openings 86 and 87 during the decomposition process. Preferably, the openings 86 and 87 are generally circular and have a diameter of about ¹⁄₆₄ of an inch or smaller. With respect to the rubber tubes 74, it has been found that if the openings 86 are ¹⁄₆₄ of an inch or smaller, the openings 86 will substantially close when no fluid is passing therethrough. Alternatively, the rubber tubes 74 and/or the stainless steel tubes 76 may be provided with injection nozzles or other suitable arrangement for injecting fluid into the waste material.

As further shown in FIG. 6, a control system, such as a computer control system 88, may be used to control injections from each of the fluid injection cells 62 into the waste material. The computer control system 88 includes a plurality of probes or sensors 89, and at least one of the sensors 89 preferably extends into each of the fluid injection cells 62 for sensing such parameters as temperature, oxygen content, carbon dioxide content and/or moisture content of the waste material disposed in the particular fluid injection cell 62. Based on the input from the sensors 89, injections of air, water and/or steam may be controlled to provide optimal conditions for aerobic waste decomposition.

Advantageously, because each fluid injection cell 62 includes fuel injection members that extend into the waste material, air and moisture distribution through the waste material is far superior to prior systems that only introduce air along the periphery of a pile of waste material. Preferably, the fluid injection members are arranged in a grid, and are spaced approximately one foot apart from each other to provide optimal fluid distribution. Furthermore, because the injection cells 62 are able to move with the waste material, optimal air and moisture distribution can be provided along the entire length of a particular bay 22 and 24.

FIG. 7 shows the structure of the vertical side wall 14 in greater detail, and it is to be understood that the vertical side walls 12 and 16 have a similar structure. Generally, the vertical side wall 14 comprises vertical post components 90 having a top post end 92 and a bottom post end 94. The bottom post end 94 may be set into a permanent type of foundation such as concrete, or simply driven into the ground as shown. If the vertical post components 90 are driven into the ground, they can be easily removed if it is desired to set up the composting system 10 in another location.

While the vertical post components 90 may comprise any suitable material, each of the vertical post components 90 preferably comprises two standard sign posts 96 bolted back to back using one or more structural connectors 98 such as disclosed in U.S. patent application Ser. No. 09/041,235, which is hereby incorporated by reference. The vertical side wall 14 may also include top and bottom horizontal members 100 and 102, respectively, and one or more cross members 104 disposed between adjacent vertical post components 90 to provide additional rigidity to the vertical side wall 14.

The vertical wall 14 further includes a filler material 106 that is used to close the space between the vertical post components 90, the horizontal members 100 and 102, and the cross members 104. The filler material 106 may comprise any suitable material such as DOW® styrofoam panels having a thickness of 3 inches. In this application, styrofoam panels are desirable because they insulate the bays 22 and 24 from each other and the outside air. As a result, low outside air temperatures will have less of an effect on the decomposition process.

The vertical end walls 18 and 20 may comprise any appropriate wall system sufficient to support waste material disposed within the bays 22 and 24. The vertical end walls 18 and 20 preferably include doorways to allow loading of the fluid injection cells 62 and the waste material into the bays 22 and 24. Because such doorways are generally well known in the art, no further description is required here.

With reference to FIGS. 1, 2, 4 and 7, installation of the composting system 10 will now be generally described. Before erecting the vertical walls 12–20, it is recommended that the entire area in which the composting system 10 is to be erected be graded to a pitch in one direction with a slight slope of approximately 2%. The direction of pitch may be along the length or across the width of the bays 22 and 24. The vertical post components 90 may then be driven directly into the ground, and installation of the vertical walls 12–20 may be completed to thereby define the bays 22 and 24. Preferably, the vertical walls 12–20 are provided in prefabricated, color coded sections that may be easily connected together.

Next, the liners 28 may be attached to the vertical walls 12, 14 and 16, such that the liners 28 extend adjacent the ground along the length of the bays 22 and 24 to thereby seal the bays 22 and 24 from the ground. As shown in FIG. 4, it is also recommended that a trough 108 be created at the lower end of the composting system 10 to collect any liquid resulting from the decomposition process. A pumping system (not shown) may also be employed in the trough 108 to pump the liquid into a holding tank (not shown) or through a filtration system (not shown) so that the liquid may be reused in the composting system 10.

Alternatively, for a more permanent structure, the vertical post components 90 can be set into concrete foundations. A concrete slab may also be installed beneath the liners 28 to further inhibit seepage into the surrounding environment.

Next, the vapor treatment system 30, the roof enclosure 26 and the other components described above may be assembled to complete installation of the composting system 10. Preferably, these components are also color coded to facilitate the installation process. Furthermore, the composting system 10 is preferably configured such that it may be easily disassembled and re-assembled at a different location.

With reference to FIG. 4, the method according to the invention of decomposing waste material involves inserting a fluid injection cell 62 through the end wall 18, and mounting the fluid injection cell 62 onto the guide rails 66 of the first bay 22. This fluid injection cell 62 will preferably have an end cap 110 to contain waste material disposed within the injection cell 62. The end cap 110 is preferably attached to the frame 70, and may comprise any suitable material such as high density polyethylene. Next, waste material is loaded into the fluid injection cell 62 and onto the nylon net 56 of the first material transporting system 52. While the waste material may be loaded in any suitable manner, the waste material is preferably loaded into the fluid injection cell 62 using a conveyor system (not shown).

Next, the electric winch 58 is activated to pull the nylon net 56, the waste material, and the fluid injection cell 62 toward the opposite end of the first bay 22 so that an unloaded portion of the nylon net 56 is near the end wall 18. An additional fluid injection cell 62 is then mounted on the guide rails 66 and connected to the previous fluid injection cell 62 using any suitable connection mechanism, such as hooks, so that the two fluid injection cells 62 are moveable together. Furthermore, the manifold systems 72 of the fluid injection cells 62 are connected together using quick connect couplings. Waste material is then loaded into the additional fluid injection cell 62 and onto the nylon net 56 as previously described. The process may continue until the entire length of the first bay 22 is loaded with fluid injection cells 62 and waste material. Alternatively, additional fluid injection cells 62 and waste material may be added to the first bay 22 as the waste material becomes available.

Next, the air compressor 82, hot water heater 84 and steam generation unit 85 are connected to the fluid injection cells 62 as previously described. Steam is then injected into the waste material so as to rapidly increase the temperature of the waste material and stimulate aerobic biological activity. Preferably, the steam is injected at a temperature in the range of 220° F. to 270° F., and a pressure in the range of 10 to 30 pounds per square inch (psi). Furthermore, more than one steam injection may be required to achieve a desired temperature of the waste material.

Based on readings from the sensors 89, shown in FIG. 6, air, water and/or steam injections from the fluid injection cells 62 may then be controlled by the computer control system 88 to ensure conditions are optimal for continuous aerobic decomposition of the waste material. Advantageously, fluid injections from each fluid injection cell 62 may be selectively controlled based on the input from the sensor or sensors 89 associated with the particular fluid injection cell 62. Alternatively or supplementally, the computer control system 88 may be programmed to provide periodic injections of fluid from each of the injection cells 62. For example, the computer control system 88 may provide an air injection for approximately one minute every half hour from each fluid injection cell, followed by approximately 10 seconds of heated water injection to moisten the waste material that may have been dried somewhat by the air injection. After the initial injection or injections of steam from each fluid injection cell 62, air is preferably injected at a pressure in the range of about 80 to 120 psi, and a temperature up to about 200° F.; water is preferably injected at a pressure in the range of about 80 to 120 psi, and a temperature up to about 200° F.; and steam is preferably injected at a pressure in the range of about 10 to 30 psi, and a temperature in the range of about 220° F. to 270° F.

After the waste material has sufficiently decomposed, the waste material may be removed from the first bay 22 and screened to remove large debris and/or non-decomposable material. Next, the waste material may be loaded into the second bin 24 in a manner similar to that described with respect to the first bay 22. Fluid injections may then be controlled by the computer control system 88 to provide optimal conditions for curing of the waste material. Alternatively, the second bay 24 may be utilized in a manner similar to the first bay 22.

Because the composting system 10 preferably utilizes an air compressor to provide relatively high pressure air to the waste material, the air is able to effectively and efficiently permeate the waste material. Consequently, the composting system 10 utilizes significantly less air compared with prior art systems and methods. For example, if air injections from each injection cell 62 are provided for approximately one minute every half hour at about 100 psi, it is estimated that each injection cell 62 will provide approximately 100 to 400 cubic feet per hour of air to the waste material. Such low volumes of air also result in significantly lower air treatment costs compared with prior art systems and methods.

In addition, because the fluid injection cells 62 distribute air throughout the waste material, the waste material does not need to be turned or otherwise mixed during the decomposition process. Consequently, the composting system 10 is significantly less costly to manufacture and operate compared with prior art systems that include mixing devices. Furthermore, because the waste material is not turned or otherwise mixed by the composting system 10, the temperature of the waste material may be easily maintained within a desired range.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A composting system for decomposing waste material, the composting system comprising:

a composting bay adapted to receive the waste material;

a transport member having at least a portion disposed in the composting bay and adapted to receive the waste material thereon, the transport member being moveable with respect to the bay for transporting the waste material along the bay; and a fluid distribution system having at least one fluid injection member adapted to extend into the waste material, the at least one fluid injection member being moveable with respect to the bay such that the at least one fluid injection member is moveable with the waste material along a portion of the bay, the at least one fluid injection member having at least one opening for introducing fluid into the waste material.

2. The composting system of claim 1 wherein the transport member comprises a nylon net.

3. The composting system of claim 1 wherein the fluid distribution system further comprises an air compressor in communication with the at least one fluid injection member for supplying air to the at least one fluid injection member.

4. The composting system of claim 1 wherein the fluid distribution system includes a plurality of fluid distribution cells moveable with respect to the bay such that the cells are moveable with the waste material along a portion of the bay, each cell including a plurality of fluid injection members adapted to extend into the waste material, and each of the fluid injection members including a plurality of openings for injecting fluid into the waste material.

5. The composting system of claim 4 wherein the fluid distribution system further comprises a steam generating unit in communication with at least one of the fluid injection members for supplying steam to the at least one fluid injection member.

6. The composting system of claim 1 further comprising a vapor treatment system for treating air that collects in the bay, the vapor treatment system including an intake in communication with the bay, and a steam tube for introducing steam into the air.

7. A composting system for decomposing waste material, the composting system comprising;
   an enclosed composting bay having a bottom, a roof enclosure and first and second ends;
   a transport member disposed proximate the bottom of the bay and adapted to receive the waste material thereon, the transport member being moveable with respect to the bay for transporting waste material between the ends of the bay;
   a guide system attached to the bay proximate the roof enclosure;
   a plurality of fluid distribution cells movably attachable to the guide system such that the cells are movable with the waste material along a portion of the bay, each of the cells having a plurality of fluid injection members adapted to extend into the waste material for injecting fluid into the waste material.

8. The composting system of claim 7 wherein at least one of the fluid injection members comprises a rubber tube.

9. The composting system of claim 7 wherein at least one of the fluid injection members comprises a steel tube.

10. A method of decomposing waste material, the method comprising:
    positioning the waste material in a composting system having a moveable transport member and a moveable fluid injection member such that the waste material surrounds a portion of the fluid injection member;
    moving the transport member to thereby move the waste material within the composting system;
    moving the fluid injection member such that the fluid injection member moves with the waste material; and
    introducing fluid into the waste material from the fluid injection member.

11. The method of claim 10 wherein moving the fluid injection member occurs as a result of moving the transport member.

12. The method of claim 10 wherein introducing fluid comprises injecting air into the waste material.

13. The method of claim 10 wherein introducing fluid comprises injecting steam into the waste material.

14. The method of claim 10 wherein introducing fluid comprises injecting heated water into the waste material.

15. The method of claim 10 positioning the waste material comprises positioning the waste material in an enclosed bay of the composting system.

16. The method of claim 15 further comprising treating air that collects in the bay by introducing steam into the air.

17. A method of decomposing waste material, the method comprising:
    providing a composting system having an enclosed composting bay and a plurality of fluid injection members moveably attached to the bay and adapted to extend into the waste material, the bay having first and second ends;
    introducing the waste material into the bay proximate the first end such that the waste material surrounds a portion of each of the fluid injection members;
    moving the waste material between the first and second ends;
    moving the fluid injection members such that the fluid injection members move with the waste material; and
    introducing fluid into the waste material from the fluid injection members.

18. The method of claim 17 wherein introducing fluid comprises selectively injecting fluid into the waste material from the fluid injection members.

19. The method of claim 17 wherein introducing fluid comprises injecting air into the waste material.

20. The method of claim 17 wherein introducing fluid comprises injecting steam into the waste material.

21. The method of claim 17 wherein introducing fluid comprises injecting heated water into the waste material.

* * * * *